US010165723B2

(12) United States Patent
Reineccius et al.

(10) Patent No.: US 10,165,723 B2
(45) Date of Patent: Jan. 1, 2019

(54) SEED TREATMENT APPARATUS

(71) Applicant: Bayer CropScience LP, Research Triangle Park, NC (US)

(72) Inventors: Greg A. Reineccius, Eden Prairie, MN (US); Steven Schulz, Eden Prairie, MN (US)

(73) Assignee: Bayer CropScience LP, Research Triangle, NC (US)

( * ) Notice: Subject to any disclaimer, the term of this patent is extended or adjusted under 35 U.S.C. 154(b) by 1161 days.

(21) Appl. No.: 14/309,563

(22) Filed: Jun. 19, 2014

(65) Prior Publication Data

US 2014/0302228 A1    Oct. 9, 2014

Related U.S. Application Data

(63) Continuation of application No. 12/848,412, filed on Aug. 2, 2010, now abandoned.

(60) Provisional application No. 61/273,325, filed on Aug. 3, 2009.

(51) Int. Cl.
*A01C 1/06* (2006.01)
*A01C 1/08* (2006.01)

(52) U.S. Cl.
CPC . *A01C 1/06* (2013.01); *A01C 1/08* (2013.01)

(58) Field of Classification Search
CPC .................................. A01C 1/06; A01C 1/08
USPC ......... 118/668, 679, 682, 696, 683; 427/4, 8
See application file for complete search history.

(56) References Cited

U.S. PATENT DOCUMENTS

| | | | | |
|---|---|---|---|---|
| 2,374,132 | A * | 4/1945 | Radde | A01C 7/04 222/218 |
| 4,514,114 | A * | 4/1985 | Fuss | B65G 53/36 406/146 |
| 4,657,773 | A | 4/1987 | Mueller | |
| 5,551,492 | A * | 9/1996 | Rack | B65B 1/363 141/147 |
| 5,632,819 | A * | 5/1997 | Geissler | A01C 1/08 118/13 |
| 5,891,246 | A | 4/1999 | Lund | |
| 6,582,516 | B1 * | 6/2003 | Carlson | A01C 1/06 118/13 |
| 2001/0029996 | A1 | 10/2001 | Robinson | |
| 2002/0117108 | A1 * | 8/2002 | Pentecost | B01J 2/006 118/303 |
| 2002/0185316 | A1 | 12/2002 | Carlson | |
| 2006/0255060 | A1 | 11/2006 | Miller | |

(Continued)

FOREIGN PATENT DOCUMENTS

DE    3415160 A1    10/1985

OTHER PUBLICATIONS

International Search Report dated Oct. 6, 2010 for PCT Application No. PCT/US2010/044086, 2 pgs.

*Primary Examiner* — Alexander M Weddle
(74) *Attorney, Agent, or Firm* — McBee Moore Woodward & Vanik IP, LLC; Susan McBee

(57) ABSTRACT

A seed treatment apparatus provides for minimal waste of products for treating seeds, in that it is precisely controllable and automatically adjustable. A volume of seeds to be treated and a flow rate of treatment product for treating the seeds can both be sensed. At least one of the flow rate of the treatment product and the volume of seeds can automatically be adjusted if it is determined that a ratio of the flow rate of treatment product to the volume of seeds is not the same as a predetermined flow rate to volume ratio.

17 Claims, 3 Drawing Sheets

(56) References Cited

U.S. PATENT DOCUMENTS

| | | |
|---|---|---|
| 2007/0083293 A1 | 4/2007 | Applegate et al. |
| 2007/0218194 A1* | 9/2007 | Carstens ............ B01F 13/1055 427/140 |
| 2009/0119986 A1 | 5/2009 | Hunter et al. |
| 2009/0125552 A1 | 5/2009 | Hunter et al. |

* cited by examiner

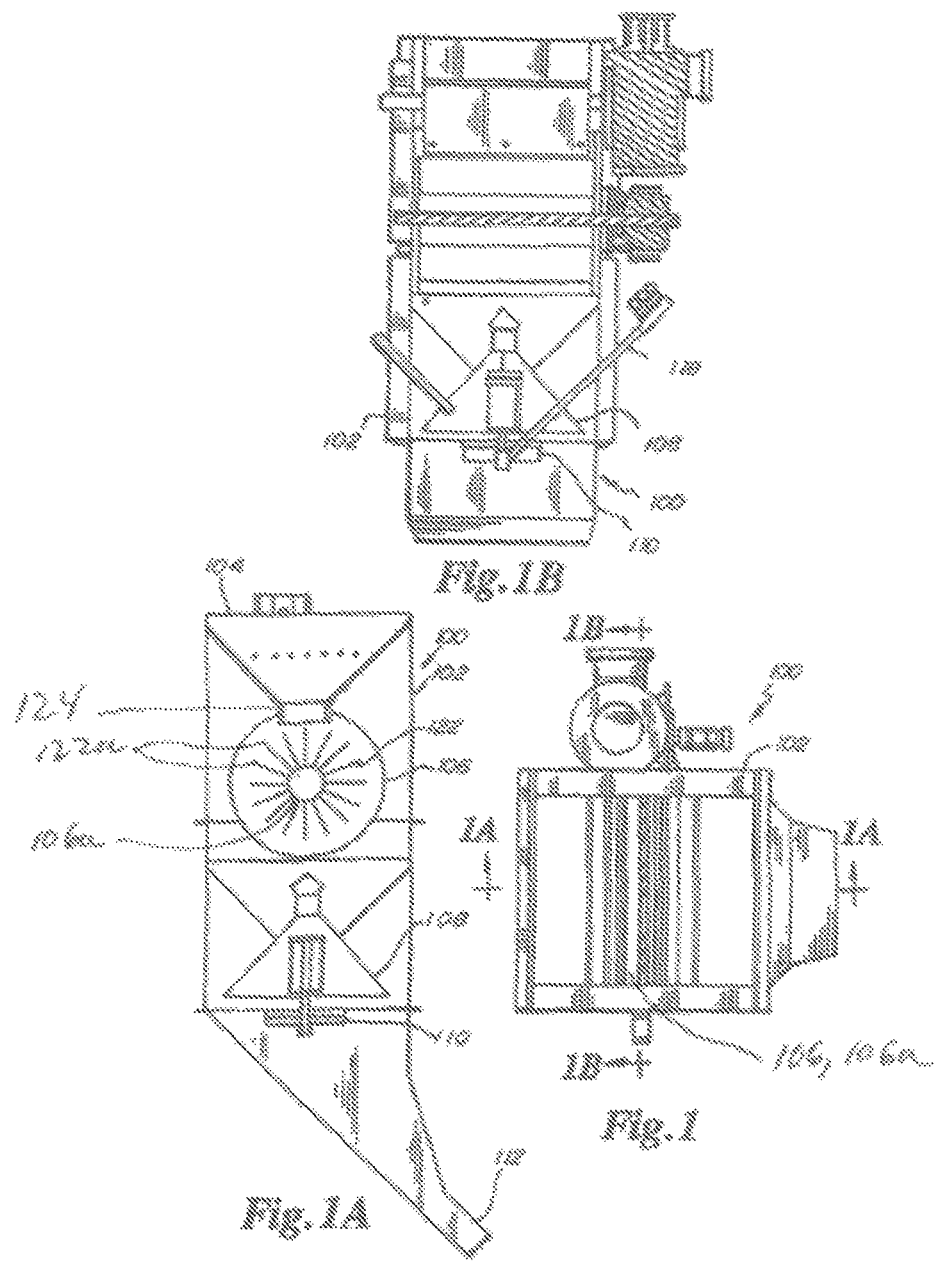

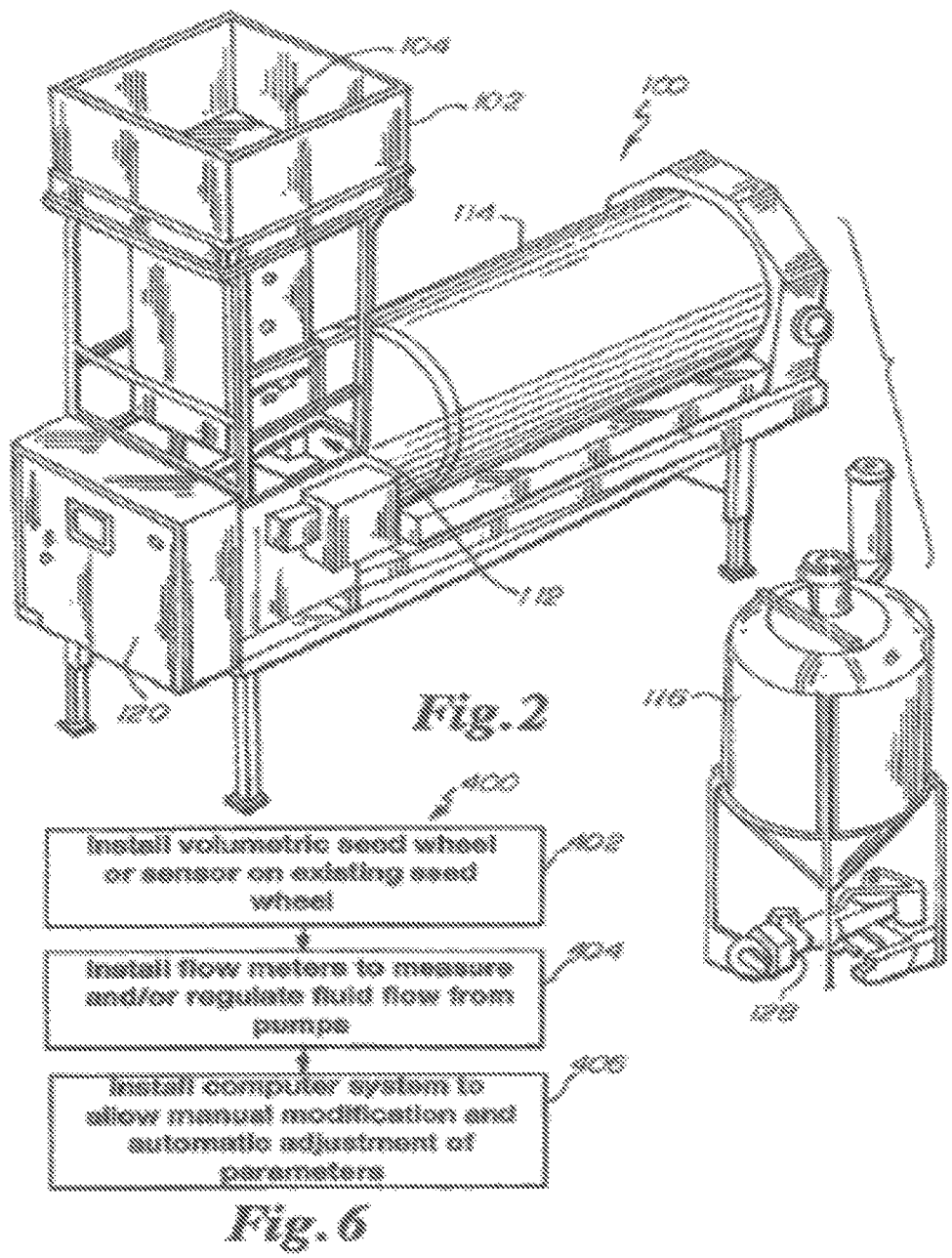

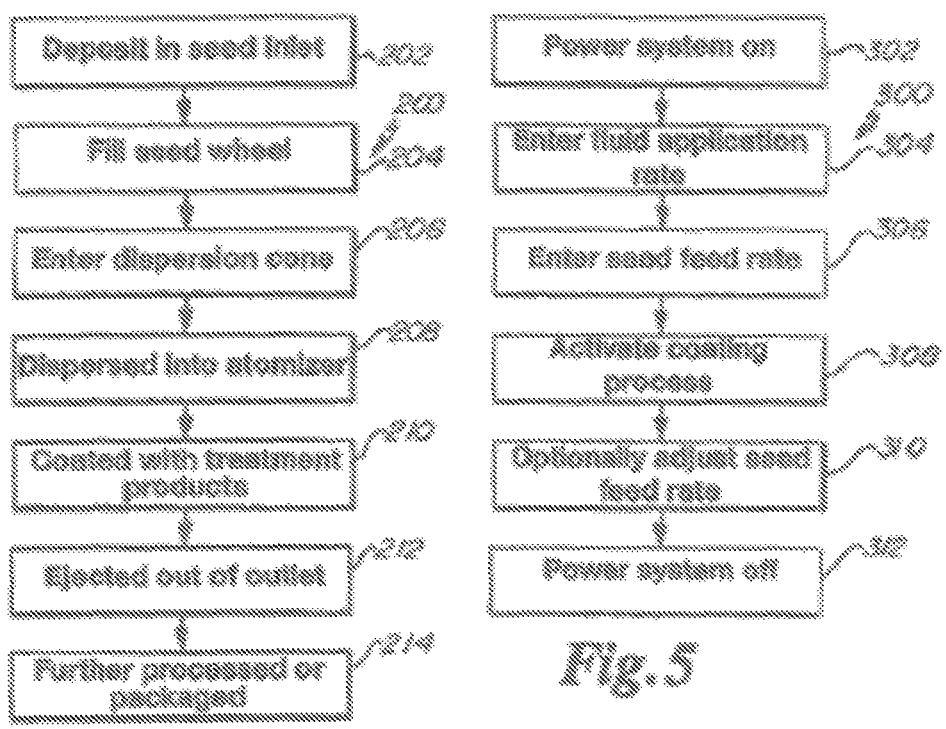
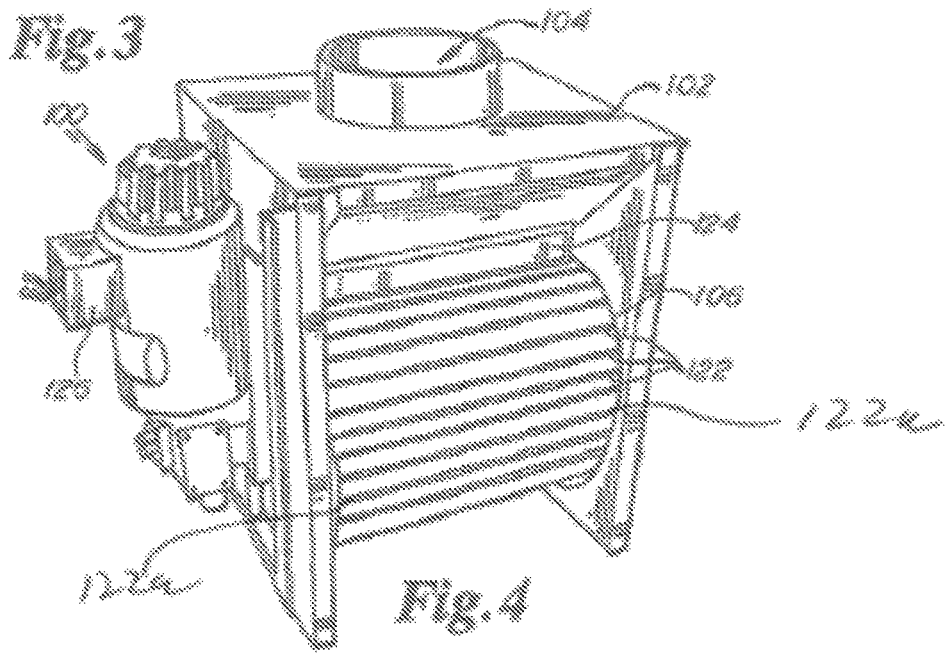

SEED TREATMENT APPARATUS

RELATED APPLICATION

This application is a continuation of U.S. patent application Ser. No. 12/848,412, filed Aug. 2, 2010, which claims the benefit of U.S. Provisional Application No. 61/273,325, filed Aug. 3, 2009, the disclosures of which are hereby fully incorporated by reference in their entirety.

FIELD OF THE INVENTION

The present invention relates to an apparatus for surface treatment of seeds and more particularly to a seed treatment apparatus that minimizes waste of treatment products.

BACKGROUND OF THE INVENTION

Seeds that are planted for agricultural and other purposes are often treated prior to planting. The treatments may accomplish various purposes including attacking target bacteria, molds and fungus that can contaminate seeds or that may be present in the soil. Also seed treatment can include insecticides, pesticides and provide deterrence or prevention of insect and other animal pests that would target seeds. Treatments may also provide fertilizer. Direct application of seed treatment allows for a reduction in the amount of treatment composition that would be required by application to soil after planting for many of the beneficial effects. Post-planting application may not penetrate the soil to a level or location where it would be effective, is weather dependent, and may not be as economical as direct seed application.

Preplanting treatment of seeds, however, involves applications of chemicals and other agents that are expensive and may even be toxic to the environment and workers. Various devices for treatment of seeds in batch or continuous treatment mode are known. U.S. Pat. No. 5,891,246 to Lund, the disclosure of which is hereby incorporated by reference, describes a seed coating apparatus for applying a coating fluid whereby seeds are dispersed with a seed dispersing member. U.S. Pat. No. 4,657,773 to Mueller, the disclosure of which is hereby incorporated by reference, describes a process and apparatus for dressing seed in which seed is guided over a dispensing cone through a jet of dressing and onto a rotary table. German patent No. DE 4411058 to Niklas, the disclosure of which is hereby incorporated by reference, describes a device with a mixing bowl connected to a high speed, multi-turn actuator and a mechanism to feed seed into the mixing bowl. The bowl rotates to rotate seed being treated therein. The seed treating formulation is sprayed in the bowl while the seed is being rotated to uniformly coat the seed with the formulation.

Such treatment apparatuses typically apply treatment products to the seeds at a uniform rate to each batch of seeds and cannot adjust application rate as circumstances dictate, such as, for example, upon a slowing of the feed rate to the seed treating equipment. A significant amount of chemical waste can be generated by applying excess treatment products to batches of seeds without precise controls. Because treatment products can be very expensive, e.g., hundreds of dollars per gallon, this can result in a large economic loss. Such chemical waste can also result in an environmental hazard. Accordingly, there is a need for an improved way to control the amount of treatment products applied to the seeds to minimize waste, particularly at the retail seed level.

Certain computerized large scale seed treaters can adjust application rate based on the weight of "flow" of seeds being processed. That is the seed being conveyed to the treatment applicator is weighed and the application rate may be varied based on the flow rate as measured by weight. There is room for improvement of this methodology as such flow weight measurement is taken over a length of the seed flow and thus requires averaging and cannot readily accommodate dramatic seed flow interruptions or variance. Moreover such equipment is expensive and not generally suitable for use at the retail level. Moreover, the weight of the seed can vary with humidity and then more or less than the optimal amount of treatment fluid may be applied to the seed.

The amount of seed treatment provided to seeds is conventionally determined by the weight of seeds, for example, x volume of treatment fluid for y weight of seeds. A useful measurement to determine the amount of treatment products needed, as well as controlling the rate of coating, is the total surface area of the seeds. The weight of seeds can vary with humidity and other factors whereas the volume of seed correlates more directly with the surface area of the seed.

For certain treatments, including formulations several of treatments applied simultaneously to the seeds, the seeds need to be planted very soon, within hours after application, for optimal effectiveness. Such seed treatment needs to be done at a local level by the seed retailer. This is problematic with existing seed treaters with automatically adjusted treating controls as such are expensive and typically are not easily used for repeated and rapid processing small batches for individual users.

SUMMARY OF THE INVENTION

The apparatus of the invention is directed towards and resolves the issues described above. The seed treatment apparatus provides for minimal waste of products for treating the seeds, in that it is precisely controllable and automatically adjusts one of a treatment product flow rate and a volumetric feed rate of the seed to the atomizer in response to a change in the other. Moreover, the device is controllable for end of batches to eliminate treatment dispensing after the seed flow has ceased. The device is economical and can be readily utilized by the seed retailer for small batches and the set-up time and effort for a new batch is minimal.

The device, in a preferred embodiment, generally comprises a seed inlet, a seed metering portion, a treatment application portion, a treated seed discharge, and a plurality of treatment tank units, and a control processor. The device may have a tumbler drum intermediate the treatment application portion and the seed discharge. Each treatment tank unit includes controllable metering pumps controlled by the control processor and in flow communication with the treatment applicator portion. The process controller has a user input, and is connected to the plurality of treatment tank units, the seed metering portion, and the treatment applicator portion. The process controller receives batch data from the user/operator, including treatment composition, treatment application rate, and seed treatment rate. The treatment composition is the formulation of the treatment fluid to be applied in precise proportions as selected from the plurality of treatment tank units. The treatment application rate is the amount of treatment fluid to volumetric measure (or weight in some embodiments) of seed. The seed treatment rate is rate of processing the seed through the device. The level sensor is connected to the process controller.

Seeds are deposited through the seed inlet, such as a hopper, into the metering portion which is configured as a seed wheel. The seed wheel has precise volumetric metering compartments circumferentially spaced around the wheel. As the wheel is rotated the compartment under the inlet fills and is rotated with excess volume in the compartment retained in the inlet. Opposite the inlet, the volumetric metering compartments discharge their contents into the treatment applicator portion, preferably an atomizer configured as an apertured rotating plate. A sensor in the inlet suitably positioned provides a signal indicating the level of the seed in the inlet. The sensor is connected to the control processor and allows control of the rotation of the seed wheel such that the wheel does not commence rotation and the flow of seed until the compartments are readily fillable at the seed inlet with seed. Moreover the application portion does not activate to dispense treatment fluid until seed dispensed by the seed wheel enters into the application portion. The seeds are metered volumetrically into the application portion by the seed wheel rotation speed. This is typically entered by the user into the control processor at the commencement of a new batch or may be saved within the control processor and automatically selected. As the seeds are discharged from the seed wheel, the seeds fall and are distributed over a dispersion cone and into a spray curtain of treatment fluid provided by an atomizer wheel. At the atomizer wheel, the seeds are coated with treatment products and then are gravimetrically dispensed into a tumbler drum where they are rotated to provide for further uniform coating. The seed is dispensed from the tumbler for packaging or transport to the planting location. Treatment products are pumped from one or more tanks into the atomizer wheel for application to seeds. Pumps are controlled to precisely regulate the flow of treatment products through pumps at a desired rate that is tied to the seed feed rate. The computerized process controller can automatically adjust at least one of the volumetric flow rates of the treatment products or the volume rate of flow of seeds entering the atomizer at any given time as controlled by the seed wheel to optimize the amount of treatment products provided and to minimize waste. If the user decides to slow the seed processing rate by manually reducing the rate at the user input of the control processor, the control processor automatically reduces the rate of treatment fluid pumped into the applicator portion, the atomizer.

A feature and advantage of the present invention is reduction of waste of treatment products in treating seeds. Seeds are metered by volume because volume has a direct correlation to surface area, unlike weight or number of seeds, which determines the amount of treatment products necessary to coat the seeds. By adjusting the amount of treatment products pumped from the tanks as a function of the volume of seeds being treated, waste of excess treatment products can be minimized.

Another feature and advantage of the present invention is that the rate of flow of seeds through the system can be adjusted without compromising the quality of seed treatment. The seed flow rate can be manually adjusted using the system's control panel. When the seed flow rate is adjusted, the system automatically increases or decreases the fluid application rate from the pumps to accommodate the corresponding increase or decrease in seeds that are being treated. This prevents either under treating seeds or producing waste from applying excessive treatment products.

Another feature and advantage of the present invention is that existing seed treatment apparatuses can be retrofit with one or more elements of the disclosed invention to allow them to adjust the fluid application rate based on the volume of seeds to be treated.

BRIEF DESCRIPTION OF THE DRAWINGS

FIG. 1 is a top view of a portion of a seed treatment apparatus according to an embodiment of the present invention.

FIG. 1A is a cross-sectional view of the portion of a seed treatment apparatus of FIG. 1 taken along the line 1A-1A.

FIG. 1B is a cross-sectional view of the portion of a seed treatment apparatus of FIG. 1 taken along the line 1B-1B.

FIG. 2 is a perspective view of a seed treatment apparatus according to an embodiment of the present invention.

FIG. 3 is a flowchart of process steps taken to coat seeds with treatment products according to an embodiment of the present invention.

FIG. 4 is a partial view of a seed treatment apparatus according to an embodiment of the present invention.

FIG. 5 is a flowchart of process steps taken to operate a seed treatment apparatus according to an embodiment of the present invention.

FIG. 6 is a flowchart of a process for retrofitting a seed treatment system according to an embodiment of the present invention.

DETAILED DESCRIPTION

Referring to FIGS. 1, 1A, 1B and 2, there can be seen elements of a seed treatment apparatus 100 according to an embodiment of the present invention. Seed treatment apparatus 100 can include a housing 102 including an inlet 104, a seed wheel 106, a dispersion cone 108, an atomizer wheel 110, and an outlet 112. Housing outlet 112 can connect to a polishing drum 114 or mixing chamber. Transverse slots 122 are formed by vanes 122*a* and outer surface 106*a* of seed wheel 106. The atomizer wheel 110 can be fluidly connected to one or more 15 treatment tanks 116 containing products for treating the seeds via an inlet tube 118. The system can be connected to a computer system with a processor having a control panel 120 for monitoring and/or adjusting the system.

FIG. 3 depicts a flowchart showing a process 200 by which seeds can be treated according to an embodiment of the present invention. Seed can first be fed into the apparatus at the housing inlet at step 202 such that it travels through the apparatus under the influence of gravity. In a preferred configuration, the apparatus is therefore vertically arranged. After entering the housing, the seed travels into and fills metering compartments, such as slots, in the seed wheel at step 204. The seed wheel is configured to collect a predetermined quantity of seed as it rotates to ultimately dispense the seed. In one embodiment, the seed wheel meters the seed based on a volume of the seed. This is advantageous because the amount of seed treatment needed is may advantageously be based on surface area, which correlates more accurately to volume than to other metering measures, such as weight and number of seeds. Seed wheel can be rotated by a motor, such as, for example, a ⅓ horsepower variable speed motor, to dispense the seed once it has been metered and to rotatably fill each adjacent slot in the wheel. After being dispensed from the seed wheel, seed falls onto the dispersion cone at step 206. The dispersion cone dispenses the seeds generally uniformly into the spinning atomizer wheel at step 208 into a curtain of treatment fluid provided by the atomizer to coat the seeds at step 210. Seeds are then ejected out of the housing outlet at step 212 and can then be further processed or packaged at step 214.

Referring to FIG. 4, there can be seen a portion of a seed treatment apparatus 100 incorporating a seed wheel 106 according to an embodiment of the present invention. Seed wheel 106 can include a plurality of radially inwardly extending slots 122 for containing seed positioned there around. A grader 124 can be positioned at a top portion of seed wheel 106 and connected to housing 102 such that it remains stationary as housing 102 rotates. Grader 124 can be positioned forward of inlet 104 relative to the direction of rotation of seed wheel 106 so that as seed is input through inlet 104 and into seed wheel 106 as it is rotated by motor 126, the grader 124 levels the seed to ensure a uniform volume of seed in each slot 122. One or more sensors (not pictured) can be positioned above the seed wheel 106 to provide the control processor data on the amount of seed in the inlet 104 which correlates to when the seed wheel slots 122 will stop being filled with seed and also correlates with when the seed will stop being deposited on the cone 108 and passing into the seed treatment region. Importantly, the control processor can then shut down the treatment fluid flow when the seed will stop passing through the seed treatment region. In one embodiment, the seed level sensor is a capacitive sensor such as those available from Turck, Inc.

The treatment portion can have an atomizer wheel 110 that receives treatment fluid from the treatment tank units 116 through an inlet tube 118 and disperses the fluid onto seeds. Atomizer wheel 110 is designed to apply treatment products at a constant rate to evenly coat each seed. In one embodiment, it can apply treatment products by atomizing them onto a falling curtain of seed before the seeds are discharged. After seeds are treated at the atomizer wheel 110, they can be discharged out of the housing 102 into a tumbling drum 114 for additional coating of the seeds by seed to seed contact. The drum then may discharge the seed for packaging or transport to the planting location. In another embodiment, seeds can be discharged from housing for packaging and transport without further processing in drum 114.

Operation of atomizer wheel 110 can be tied to seed wheel 106 such that when seed wheel 106 stops rotating (because of a pause in operation or because there is no more seed left to treat), atomizer wheel 110 can stop operating either at the same time or at a predetermined time shortly afterwards.

Treatment products are received into the atomizer wheel 110 through an inlet tube 118 that is fluidly connected to one or more treatment tank units 116. Tank units can include premix tanks designed to mix liquid treatment products requiring dilution or agitation. Premix tanks can include motorized rotating paddles and internal baffles for mixing the treatment products and providing suspension of the liquid with minimal foam. Non-mixing tanks can also be connected to atomizer wheel, such as, for example, water tanks, bulk tanks and dye tanks.

Pumping systems 128, such as peristaltic pumps, draw treatment products from tanks and dispense them to the atomizer wheel through fluid lines. Pumping system can include flow meters for measuring and/or regulating the amount of product being dispensed. Fluid lines can enter a static mixer to mix treatment products from various tanks before entering inlet tube.

Seed treatment apparatus 100 can include a computerized treatment system that proportions amounts of seed and treatment products to provide for minimal treatment product waste. Computerized treatment system can include sensors, flow meters, and/or controls to monitor/control both the flow rates of the treatment products coming out of the pumps and the metered volume of seeds released from the seed wheel. Based upon a pre-programmed algorithm, the system can automatically adjust the flow rates of the treatment products based on the volume of seeds to be treated at a given time to control the amount of treatment product applied to the seeds. Thus, if a flow sensor sensing the flow rate of the treatment products and a seed sensor sensing the volume of seeds indicate that the ratio of flow rate to volume is not within a desired amount of a predetermined optimal ratio or a range of ratios, the system can automatically adjust the flow rate and/or the volume. This provides a more accurate distribution of treatment product because the correlation of volume of seeds to amount of treatment product needed is more accurate than a correlation to number of seeds or weight of seeds.

The system can also include a display providing the information to a user and allowing the user to make manual adjustments to the parameters. Display can allow a user to calibrate flow rates for treatment products and seed and to set other parameters, such as the amount of time the pumps should run and the specific chemical recipe of the treatment products that is to be applied. A user can also enter a desired ratio between flow rate of treatment products and volume of seed for the computer system to follow in automatically adjusting the flow rate as the volume of seed varies. Alternatively, this ratio can be preprogrammed in the system for the specific type of seed and treatment composition.

FIG. 5 depicts a flowchart depicting one example of user operation 300 of an embodiment of seed treatment apparatus according to the present invention. Initially, the system must be powered on at step 302. The user can then enter the desired fluid application rate that dictates the operation of the pumps at step 304 and the seed feed rate than is controlled by the speed at which the seed wheel rotates at step 306. The user can then deposit seed in the seed inlet and activate the coating process for treating the seeds at step 308. The treating process will continue automatically as described above until all of the seed is coated. As the treating process takes place, the user can optionally adjust the seed feed rate at step 310. If the seed feed rate is adjusted, the fluid application rate will automatically be adjusted proportionally. Once all of the seed has been treated, at step 312 the system can be shut off.

Adjustment of application of treatment products relative to volume of seeds can be especially useful at the end of a series of seed batches. For example, a mass of seeds may be deposited into the inlet. The seed wheel then rotates at a predetermined rate, filling each slot with the metered volume of seeds. However, at the end of the mass of seeds, if more seeds are not deposited directly on top of the previous seeds, the last slot on the seed wheel to be filled may not be filled to the preset metered volume. In this situation, the amount of treatment product pumped into the atomizer for this final batch of seeds would be reduced proportionally based on the volume of seeds as measured by the seed level sensor. This can prevent a large amount of treatment product waste from this final batch. In addition, during operation there may be times when it is desirable to either increase or decrease the rate at which seed is fed into the seed wheel. When the seed rate is manually adjusted, the system can automatically adjust the pump output to match the increase or decrease in seed volume in each batch of seeds so that there is not either too much or too little treatment product applied.

In a further embodiment, an existing system utilizing pumps for applying treatment products to seeds can be retrofit with the above described sensors, flow meters, controls, etc. to convert the system into one that modifies pump volume based on seed flow. Retrofitting an existing system can include some or all of the steps 400 depicted in FIG. 6 in any order. The existing system may already include a seed inlet, a means for dispensing seeds, a means for coating seeds and a pump system for supplying treatment products to seeds. Steps that could be taken include, for example, replacing the means for dispensing seeds with the volumetrically-based seed wheel described above or installing a seed level sensor in the means for dispensing seeds for measuring the volume (or weight) of seeds being dispensed at step 402, installing one or more flow meters for measuring the speed and/or volume of treatment products being pumped to the means for coating seeds at step 404 and installing a computer system, display, and/or software to allow the fluid application rate and seed flow rate to be modified and to automatically adjust the output of treatment products from the pumps based on the volume of seeds to be treated at step 406.

What is claimed is:

1. A method of treating seeds with a seed treatment apparatus having a control processor, the method comprising:
    (a) depositing a plurality of seeds through a seed inlet in the seed treatment apparatus into a seed meter, wherein the seed meter comprises a rotatable seed wheel having an outer surface and a plurality of slots, thereby depositing into each slot a preset metered volume of the plurality of seeds;
    (b) controlling the seed meter by the control processor to provide a volumetric flow rate of seeds passing therethrough;
    (c) sensing the seed in the inlet above the seed meter and sending data to the control processor for determining when the seed meter will run out of seed for metering;
    (d) discharging the seeds from the seed meter at the volumetric flow rate through a seed treatment region of a seed treatment applicator;
    (e) individually pumping from at least one of a plurality of treatment tank units treatment fluid into the seed treatment applicator, each one of said plurality of treatment tank units comprising a pump and controlling each one of said pumps by the control processor thereby regulating a volumetric flow rate and thereby coating the seeds passing through the seed treatment region at least one of a plurality of a predetermined range of ratios of the volumetric flow rate of treatment fluid to the volumetric flow rate of the seed, with the treatment fluid from the plurality of treatment tank units; and
    (f) discharging a plurality of treated seeds from the seed treatment applicator;
        wherein when one of the flow rate of the treatment fluid pumped to the seed treatment applicator and the volumetric flow rate of seeds changes during the seed treatment, the other is automatically changed by the control processor thereby maintaining a predetermined ratio of the volumetric flow rate of treatment fluid to the seed volumetric flow rate,
wherein after the seeds are treated by the rotatable seed wheel, the seeds are discharged into a tumbling drum for additional coating of the seeds by seed to seed contact and wherein the rotatable seed wheel is positioned between the treatment application portion and a seed discharge portion.

2. The method of claim 1 further comprising determining with the control processor when the seed meter will run out of seed based on sensing the seed in the seed inlet and stopping the pumping of the treatment fluid when the seed will stop passing through the seed treatment region.

3. The method of claim 1, wherein the seed treatment applicator includes an atomizer configured as a rotating plate for coating the seeds and a dispersion cone, and wherein the discharging the seeds into the seed treatment applicator includes dropping the seeds onto the dispersion cone to generally uniformly disperse the seeds around the atomizer.

4. The method of claim 1, further comprising manually modifying one of the volumetric flow rate of seeds or the volumetric flow rate of the treatment fluid using a control panel communicatively coupled to the control processor.

5. The method of claim 1, wherein discharging the seeds from the seed meter into a seed treatment applicator includes rotating the seed wheel to drop the seeds into the seed treatment applicator.

6. The method of claim 1, wherein the sending data to the control processor is performed when the last slot of the plurality of slots on the rotatable seed wheel is not filled to the preset metered volume.

7. The method of claim 1, wherein each one of the plurality of slots is formed by a portion of the outer surface of the rotatable seed wheel and two of a plurality of transverse vanes.

8. The method of claim 1, wherein the seed treatment apparatus further comprises at least one mix-tank and a tumbling drum.

9. The method of claim 1, wherein the seed wheel is rotated by a motor.

10. The method of claim 9, wherein the motor is configured to dispense a seed after the seed has been metered and to rotatably fill an adjacent slot in the seed wheel.

11. A method of adjusting the application of a treatment-fluid to a plurality of seeds in a continuous flow seed treatment apparatus, the method comprising:
    (a) depositing seed into a seed inlet to be fed into a rotatable seed wheel having an outer surface and a plurality of slots and controlling by the rotation of the rotatable seed wheel a volumetric feed rate of seeds to be treated in the seed treatment apparatus with a control processor, thereby depositing into each slot a preset metered volume of the plurality of seeds;
    (b) dropping the seeds from the seed wheel into a seed treatment region;
    (c) controlling the volumetric flow rate of a treatment fluid for coating the seeds by the control processor with a predetermined range of ratios of volume of treatment fluid to seed volume and sending data to the control processor when the last slot of the plurality of slots on the rotatable seed wheel is not filled to the preset metered volume;
    (d) monitoring the volumetric flow rate of the treatment fluid and the volumetric feed rate of the seeds by the control processor; automatically adjusting by the control processor either the volumetric flow rate of the treatment fluid when the volumetric feed rate of seeds changes or automatically adjusting by the control processor the volumetric feed rate of seeds when the volumetric flow rate of the treatment fluid changes, thereby maintaining the predetermined ratio range of volumetric flow rate of treatment fluid to the volumetric feed rate of seed; and,
    (e) wherein each one of the plurality of slots is formed by a portion of the outer surface of the rotatable seed wheel and two of a plurality of transverse vanes,
wherein after the seeds are treated by the rotatable seed wheel, the seeds are discharged into a tumbling drum for additional coating of the seeds by seed to seed contact and wherein the rotatable seed wheel is positioned between the treatment application portion and a seed discharge portion.

12. A method of treating seeds with a seed treatment apparatus having a control processor, the method comprising:
(a) depositing a plurality of seeds through a seed inlet in the seed treatment apparatus into a seed meter comprising a rotatable seed wheel having an outer surface and a plurality of slots, thereby depositing into each slot a preset metered volume of the plurality of seeds;
(b) controlling with the seed meter a volumetric flow rate of seeds passing the seed meter;
(c) sensing the seed in the inlet above the seed meter and sending data to the control processor for determining when the seed meter will run out of seed for metering;
(d) discharging the seeds from the seed meter at the volumetric flow rate through a seed treatment region of a seed treatment applicator;
(e) pumping a treatment fluid into the seed treatment applicator at a volumetric flow rate thereby coating the seeds passing through the seed treatment region with treatment fluid with at least one of a predetermined range of ratios the volumetric flow rate of treatment fluid to the volumetric feed rate of seed with treatment fluid;
(f) discharging treated seeds from the seed treatment applicator;
(g) determining with the control processor when the seed meter will run out of seed based on sensing the seed in the seed inlet and stopping the pumping of the treatment fluid when the seed before, at the time, or after the seed stops passing through the seed treatment region;
(h) wherein when one of the flow rate of the treatment fluid pumped to the seed treatment applicator and the volumetric flow rate of seeds controlled by the seed meter is automatically adjusted during the seed treatment when the other is changed thereby maintaining the at least one of the predetermined range of ratios of the volumetric flow rate of treatment fluid to the seed volumetric flow rate; and,
(i) wherein each one of the plurality of slots is formed by a portion of the outer surface of the rotatable seed wheel and two of a plurality of transverse vanes,
wherein after the seeds are treated by the rotatable seed wheel, the seeds are discharged into a tumbling drum for additional coating of the seeds by seed to seed contact and wherein the rotatable seed wheel is positioned between the treatment application portion and a seed discharge portion.

13. The method of claim 12, wherein pumping a treatment fluid from a treatment tank includes pumping a plurality of treatment products from a plurality of treatment tanks and mixing the treatment products into a predetermined treatment mixture for coating the seeds.

14. The method of claim 12, further comprising manually modifying one of the volumetric flow rate of seeds or the volumetric flow rate of the treatment fluid using a control panel communicatively coupled to the apparatus.

15. The method of claim 12, wherein the sending data to the control processor is performed when the last slot of the plurality of slots on the rotatable seed wheel is not filled to the preset metered volume.

16. The method of claim 12, wherein the control processor is configured to receive batch data from an operator.

17. The method of claim 16, wherein said batch data are selected from the group consisting of treatment composition, treatment application rate, seed treatment rate, or any combination thereof.

* * * * *